United States Patent [19]

Hardie et al.

[11] Patent Number: 5,051,127
[45] Date of Patent: Sep. 24, 1991

[54] PROCESS FOR POST COMBUSTION

[75] Inventors: Gregory J. Hardie; John M. Ganser, both of Amberg, Fed. Rep. of Germany

[73] Assignee: Klockner CRA Patent GmbH, Duisburg, Fed. Rep. of Germany

[21] Appl. No.: 308,584

[22] Filed: Feb. 10, 1989

[30] Foreign Application Priority Data

Feb. 12, 1988 [AU] Australia ............................... PI 6741
Feb. 12, 1988 [AU] Australia ............................... PI 6745
Jul. 29, 1988 [AU] Australia ............................... PI 9558

[51] Int. Cl.⁵ ............................................. C21B 7/076
[52] U.S. Cl. ....................................... 75/553; 75/492; 75/502; 75/551; 75/552; 75/555
[58] Field of Search ............... 75/28, 29, 38, 40, 59.17, 75/59.23, 502, 492, 553, 551, 552, 555; 266/266

[56] References Cited

U.S. PATENT DOCUMENTS

| 3,028,231 | 4/1962 | Klemantaski et al. | 75/38 |
| 4,566,904 | 1/1986 | von Bogdandy et al. | 75/38 |
| 4,701,214 | 10/1987 | Kaneko et al. | 75/38 |
| 4,798,624 | 1/1989 | Brotzmann et al. | 75/502 |
| 4,861,368 | 8/1989 | Brotzmann et al. | 75/502 |

FOREIGN PATENT DOCUMENTS 400793 11/1933 United Kingdom ................ 266/266

Primary Examiner—Melvyn J. Andrews
Attorney, Agent, or Firm—Armstrong, Nikaido, Marmelstein, Kubovcik & Murray

[57] ABSTRACT

Process and apparatus for post combustion of reaction gases generated in a molten iron bath above the bath by means of at least one jet of oxidizing gases, whereby energy thereby produced is transferred to the bath and whereby the or each jet of oxidizing gases is injected with a swirl through one or more tuyeres towards the surface of the bath or the or each jet of oxidizing gases is injected in the form of a hollow jet through one or more tuyeres towards the surface of the bath.

20 Claims, 2 Drawing Sheets

PROCESS FOR POST COMBUSTION

The present invention relates to a process and an apparatus for post combustion of reaction gases. In particular, the present invention relates to a process and an apparatus for post combustion of reaction gases generated from reactants introduced into a molten bath of iron and iron oxides.

The reactants introduced into the bath are carbonaceous materials, especially coal and oxidizing gases, especially air and oxygen. The reactant can be introduced into the bath by bottom blowing tuyeres or top blowing tuyeres or a combination of the two. The reaction gases generated consist essentially of carbon monoxide and hydrogen. The reaction gases are post combusted with oxidizing gases above the iron melt. Energy obtained by the post combustion is transferred to the iron bath.

In one recently developed process for producing iron from iron oxides the energy released by the oxidation of reaction gases generated in a molten bath contributes to the energy required to reduce the iron oxides in the molten bath. The reaction gases comprise carbon monoxide and hydrogen. In the case of carbon, only 15% of the energy available is released when carbon is oxidized to carbon monoxide, and the remainder of the energy is released when the carbon monoxide is oxidized to carbon dioxide. It can be appreciated that such post combustion of carbon monoxide to carbon dioxide could contribute substantially to the energy requirements for the reduction of iron oxides to iron. However, the levels of post combustion that can reliably and reproducibly be achieved in steelmaking with the simultaneous highly efficient transfer to the bath of the heat thereby generated, are low.

The object of the invention is to provide a process and an apparatus for post combustion which is capable of reliably and reproducibly achieving a predetermined degree of post combustion whilst maintaining operational reliability (even at high degrees of post combustion) thereby to realize economies in processes such as steelmaking, smelt reduction of iron ores or prereduced iron ores, coal gasification, and combined processes in this field.

According to a first aspect of the present invention there is provided a process and an apparatus for post combustion of reaction gases, in which reactants are introduced into a molten iron bath, the reaction gases thereby generated are post combusted above the bath by means of at least one jet of oxidizing gases, and the energy thereby produced is transferred to the bath at a high degree of efficiency, characterized in that the or each jet of oxidizing gases is injected with a swirl, as described herein, through one or more tuyeres towards the surface of the bath.

It has been found that a swirl, i.e. in terms of fluid dynamics an angular momentum, imposed on the jet of oxidizing gases considerably improves the post combustion of the reaction gases generated in the bath and in particular increases the reliable reproducibility of a selected degree of post combustion thereby offering a number of advantageous variations of the process for post combustion of reaction gases.

The term "angular momentum" is understood herein to mean the tangential component of the jet of oxidizing gases. The term "swirl number" is understood herein to mean the ratio of the tangential to the axial gas momentum.

The outlet of the or each tuyere may be of usual configuration, i.e. circular cross section. It is also possible to use any other geometrical cross section and even a division into several outlets is possible.

The swirl may be imposed on the or each jet of oxidizing gases by any means or method. For example, the use of guide plates or deflectors upstream of the outlet opening of the or each tuyere has proved successful. Also, a number of openings arranged in the same direction at an inclined position have been found to result in a jet of oxidizing gases with a tangential component, i.e. with a swirl. It is also possible to construct the or each tuyere with a chamber upstream of the outlet arranged to receive the oxidizing gases tangentially so as to impose in this way an angular momentum to the jet of oxidizing gases.

By means of the first aspect of the invention it is possible to improve post combustion by more than 10% as compared to a usual "free" non-swirl jet, with other conditions remaining the same. For instance, it has been found that injection of oxidizing gas at 1200° C. through a tuyere with a circular outlet of 150 mm diameter at a flow rate of approximately 130 $Nm^3$/min without swirl resulted in post combustion of 30%, whereas by imposing a relatively low swirl onto the oxidizing gases, i.e. a swirl number of 0.2, it was possible to achieve a post combustion of 45%.

The or each jet of oxidizing gases may be injected towards the surface with the swirl at any swirl number. However, swirl numbers ranging from 0.1 to 5, preferably between 0.1 and 2, have been found to be the most favorable operating conditions.

A feature of the first aspect of the invention is that, on the one hand, it is possible to adjust the degree of post combustion to particular operational conditions in the reactor vessel and, on the other hand, it is possible to control the process, in particular the energy input to the bath. Thus, for instance, with a single tuyere the degree of post combustion can be controlled reliably and reproducibly between 35% and 80% merely by varying the swirl number, without adversely affecting high heat transfer to the bath.

The installation angle and the installation height of the or each tuyere may be chosen within a wide range. The installation angle of the or each tuyere may be chosen between 10° and 90° to the quiescent bath surface, preferably, however, between 30° and 90°. Equally, the path length of the or each jet of oxidizing gas in the gas space of the reactor vessel may differ widely. The path length, of course, influences the size of the impact area of the oxidizing gases on the bath surface. As to the installation height of the or each tuyere, both the geometry of the reactor vessel and the process itself should be considered. For instance, in bottom blowing steelmaking processes a slightly higher installation height should be chosen than for other processes due to the severe boiling and eruption zone which is a characteristic of bottom blowing steelmaking processes. However, the installation height is not limited to the minimum distance of 2 m above the calm bath surface which applies generally to the known free jet without swirl. In the case of smelt reduction processes in drum-type reactor vessels, where only the ore and the combustibles are injected below the bath surface, whilst the oxidizing gases are mainly top blown, it is possible to choose a shorter path length for the jet with swirl. Distances between the quiescent bath surface and the outlet of the tuyere of approximately 0.5 m to 10 m have been found to be successful.

Basically, there are no limitations on the selection of the oxidizing gases injected through the or each tuyere. The oxidizing gases may be oxygen, air or oxygen with inert gas $CO_2$ and/or $H_2O$ and any mixtures of the aforementioned gases.

Further, it is preferred to preheat the oxidizing gases to improve the overall heat balance of a process, such as a smelt reduction process. It is possible to use hot process off-gases for heating the oxidizing gases by means of suitable heat exchangers. The use of preheated air at a temperature of 1000° to 1600° C. has been found to be particularly advantageous for the process according to the first aspect of the invention.

According to a second aspect of the present invention there is provided a process and an apparatus for post combustion of reaction gases, in which reactants are introduced into a molten iron bath, the reaction gases thereby generated are post combusted above the melt by means of oxidizing gases, and the energy thereby produced is transferred to the bath at a high degree of efficiency, characterized in that the oxidizing gases are injected in the form of at least one hollow jet through one or more tuyeres towards the bath surface.

It has been found that injection of oxidizing gas in the form of a hollow jet is an important factor in achieving efficient post combustion of reaction gases and efficient transfer to the bath of energy generated by the post combustion. Specifically, it has been found that for a given flow rate of oxidizing gas through a tuyere having an outlet of a given cross-sectional area there is an unexpectedly high level of post combustion and energy transfer to the bath if the outlet forms a hollow jet compared to the levels of post combustion and energy transfer achieved if the outlet is circular.

The second aspect of the invention is not restricted to simple forms of a hollow jet, such as a hollow cone produced when gas is blown through an annular tuyere having a solid core, but relates to any possible form of hollow jet. The possible forms include any geometric form of an annular slot tuyere, such as circular and elliptical, any curved shape, as well as angular forms, such as triangles, rectangles, parallelograms, and polygons. All of these configurations usually enclose a fixed or movable inner core. The annular slot may also be interrupted or divided into individual segments. For instance, it is possible to arrange individual tuyeres directly side by side or at a preselected spacing around a geometric center of any shape. Annular slots with intermediate walls, e.g. as support, or with corresponding guide plates installed for influencing the gas stream have also proved successful.

It is also possible to use a double or multiple tuyere in order to achieve a hollow gas jet. For instance, the multiple tuyere may be used if different gases are separately conveyed to the tuyere so that there is mixing of the gases only after the gases have left the tuyere.

The oxidizing gas may be injected with a swirl in the hollow jet thereby combining both the first and second aspects of the invention. Preferably the swirl number is in the range of 0.1 to 5.0.

It has been found to be possible to reliably and reproducibly achieve degrees of post combustion in the range between 30% and 80% by varying the swirl number from 0 to 2 in a hollow jet of air preheated to approximately 1200° C. injected into a drum-type reactor vessel used for smelt reduction. The degree of efficiency of transferring the energy of post combustion to the bath was found to be in the range of 80 to 90%.

The foregoing surprising effect of the combination of the first and second aspects of the invention may theoretically be explained. In this regard, on the assumption that the injection of carbonaceous combustibles below the bath surface creates a turbulent bath with the formation of an eruption and mixing zone, hereinafter referred to as a "transition zone", above the bath surface, it may be supposed that in addition to reaction gases, in particular CO and $H_2$, molten material, such as metallic droplets and splashes, from the bath is also injected into the transition zone. The molten material does not remain in the transition zone but rather circulates back into the bath. As a consequence, energy transferred to the molten material in the transition zone is conveyed directly into the bath. Under these conditions, in addition to the characteristic (also exhibited by a non-swirling free jet) of being able to suck in reaction gases from the surrounding space, the center of the hollow jet is also able to suck in reaction gases. The reaction gases are very quickly combusted by means of the oxidizing gas of the hollow jet, and when the jet impinges on the transition zone the energy generated by the combustion is transferred to the molten material and then to the bath at a high rate. As compared to known top blowing technology comprising a free jet which only sucks in reaction gases from the surrounding gas space, the use of a hollow jet means that a second combustion zone is formed in the center of the hollow jet. This beneficial effect is believed to be increased by the use of swirl by virtue of the pressure in the center of the hollow jet decreasing with the increasing swirl number.

In one preferred arrangement, pulverized solid reactants are injected in the or each hollow part of the hollow jet. For this purpose, the solid core or inner body of the or each tuyere may, for example, be equipped with a supply duct for the solid reactants. Such a supply duct may comprise a duct lined with an abrasion-resistant material. The solid reactants are then blown through the duct towards the bath in suspension with a carrier gas. This technique, for instance, has been successfully applied in smelt reduction to inject iron ore, prereduced iron ore and in particular prereduced and preheated iron ore into a bath in a reaction vessel.

It is possible to arrange two or more tuyeres in a reactor vessel in order to achieve controlled and reproducible post combustion of the reaction gases generated in the bath. It is possible to combine tuyeres of the same design or tuyeres of different design to form a jet of oxidizing gas with swirl. The number of tuyeres in a reactor vessel is determined by different factors, e.g. the vessel size or the maximum gas flow rate of each individual design. It is, for instance, possible to use only a single tuyere in a drum-type reactor vessel of 15 t. capacity, whereas in a steelmaking converter with a 100 t. capacity it is preferred to use two tuyeres in the upper region of the converter.

It has been found to be possible to achieve degrees of post combustion in the range of 38% to 68% by varying the swirl number in a drum-type reactor vessel for smelt reduction, under conditions in which approximately 30 kg/min. coal and approximately 30 to 60 kg/min. iron ore were injected into an iron melt of about 10 t and about 8000 $Nm^3$/h hot blast air at a temperature of 1200° C. was blown through a tuyere onto the bath surface. Under these conditions, and using a swirl number of zero, it was possible to attain a degree of post combustion of 38%. It was also possible to increase the degree of post combustion by increasing the swirl number. In this regard, at a swirl number of 0.3 the degree of post combustion was approximately 48%, a further increase of the swirl number to 0.6 resulted in a degree of post combustion of 58%, and at a swirl number of 0.9 the degree of post combustion was about 68%. The tuyere comprised an annular slot with a slot width of 35 mm and an outside diameter of 300 mm. The swirl number was varied by mechanically manipulating the flow in the tuyere.

It is thus possible to achieve stepwise changes in the degree of post combustion by changes to the geometry of the tuyeres for oxidizing gases, whereas the precise adjustment of post combustion and exact control between the individual steps can be realized by variation of the swirl number. Accordingly, using a conventional tuyere with a circular opening, it is possible to achieve a degree of post combustion of about 30% at a swirl number of 0.1, and by increasing the swirl number to about 1 the degree of post combustion can be increased to approximately 55%. When using an annular slot tuyere to form a hollow gas jet without swirl (swirl number 0), a degree of post combustion of at least 40% can be achieved, which can be increased with an increasing swirl number (up to about 1.0) to approximately 75%. When using an annular slot tuyere of optimal design, e.g. with decreasing slot width among other factors, it is possible to achieve controlled degrees of post combustion in the range of 30% to 100% by varying the swirl number.

When applying the process according to the first and second aspects of the invention for the purpose of smelt reduction, the reactants can be introduced either below the bath surface or by means of top blowing. Both submerged tuyeres for ore supply and top blowing tuyeres, by means of which ground ore is injected into the iron melt, have proven a success. In the case of injection tuyeres below the bath surface it is possible, for instance, to use an OBM-tuyere which consists of two concentric pipes. In use of the OBM-tuyere, fine-grained ore entrained in a carrier gas is injected through the central pipe and gaseous and/or liquid hydrocarbons for tuyere protection are blown through the annular slot. Analogously, instead of ore, carbonaceous combustibles, e.g. coke or coal of different qualities, may be injected into the bath. It is also possible to inject oxidizing gases, such as oxygen, air or inert gas-oxygen mixtures through submerged tuyeres.

The reactants may be partly or completely injected into the reaction vessel through tuyeres or lances positioned above the bath. In this case the impact of the carrier gas and ground solid material hitting the bath surface is usually sufficiently strong for the solid material to penetrate into the bath.

The addition of lump ore by means of devices arranged above the bath surface is also within the scope of the first and second aspects of the invention.

All gaseous, liquid and solid materials supplied to the bath may be preheated in order to improve the overall heat balance. The preheating temperature is optional and is in most cases limited by the transport system.

The or each tuyere may consist of an annular tuyere with a shell and an inner member which has a diameter of at least double, preferably fivefold, the width of the slot. The inner member may take the form of a piston arranged for movement in an axial direction.

The inner member may comprise a flow element with a piston bar. Further, the inner member could be solid and fixed.

The process and apparatus of the present invention can be used in a steelmaking process with great advantage. In the steelmaking process the carbon of the iron and optionally additional carbonaceous materials added to the iron, for example to increase the scrap rate, are reacted with oxygen. The reaction gases generated consist mainly of carbon monoxide and hydrogen. These reaction gases can be post combusted above the iron bath with oxidizing gases. Energy produced by the post combustion can be transferred to the bath. Such processes are described in U.S. Pat. No. 4,195,985. Special reference is made to the disclosure of this patent which is incorporated into this specification by this reference.

Further, the process and apparatus of the present invention can be used with great advantage in a coal gasification process in a molten iron bath. In such a process carbonaceous materials, especially coal and oxidizing gases are reacted in the iron bath to generate reaction gases, consisting mainly of hydrogen and carbon monoxide. These reaction gases can be partly post combusted above the iron bath with oxidizing gases. Energy produced by the post combustion can be transferred to the bath. Such processes are described in the German patent specifications 25 20 883 and 30 31 680 as well as the Australian patent specification 539 665. Special reference is made to the disclosure of these patent specification.

The process and apparatus of the present invention can also be used with great advantage in an iron ore smelt reduction process where iron ore is reduced in a molten iron bath with carbonaceous materials, especially coal. The reaction gases generated which consist mainly of carbon monoxide and hydrogen can be post combusted above the iron bath with oxidizing gases. Energy produced by the post combustion can be transferred to the bath. Such processes are described in U.S. Pat. Nos. 4,566,904 and 4,798,624. Reference is made to the disclosure of these patent specifications. Their disclosure is to be regarded as incorporated into this specification by this reference.

The following is a description, by means of non-limiting examples and schematic figures, of preferred embodiments of the process and apparatus according to the invention.

Figure 1:
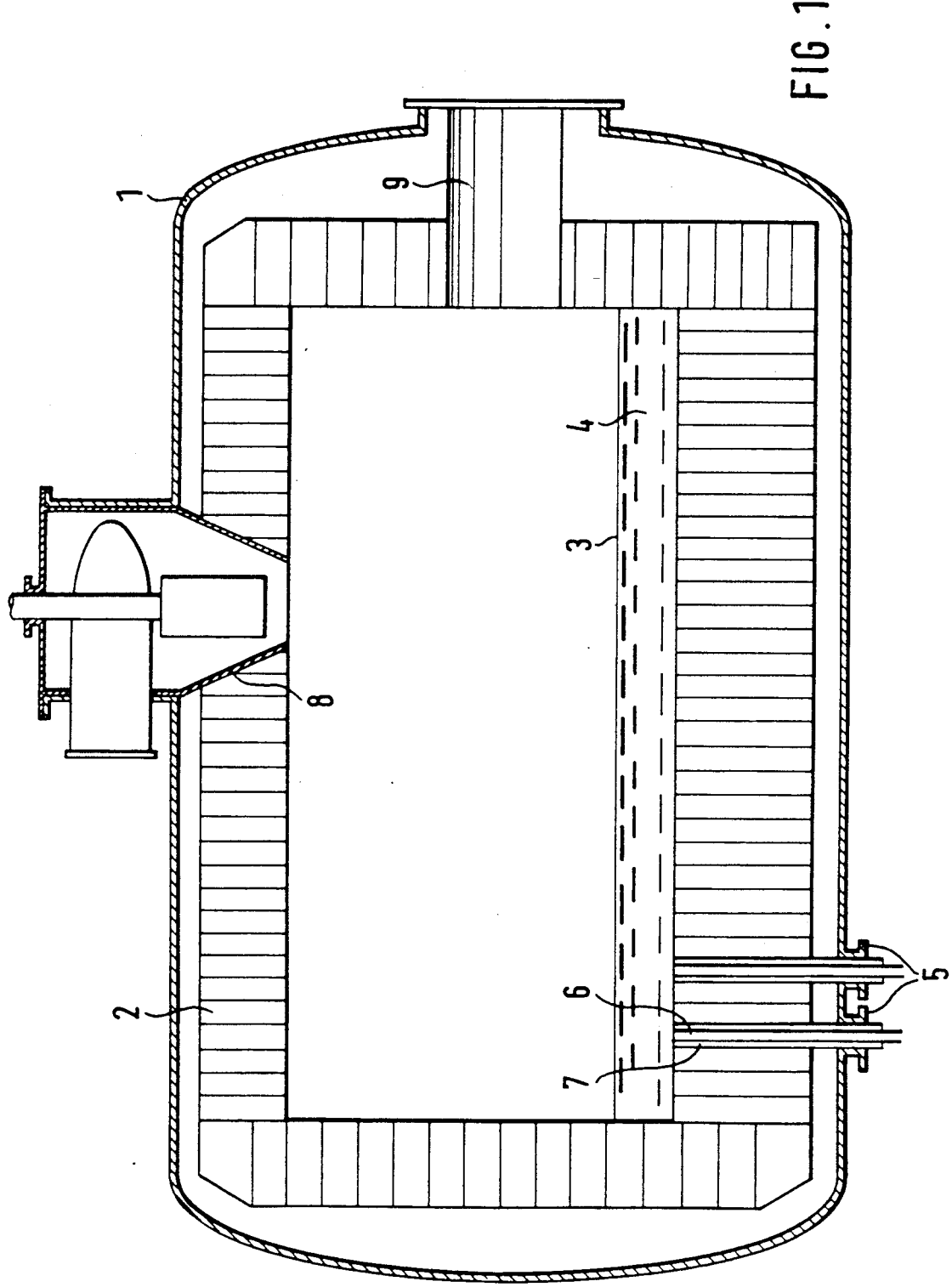
FIG. 1 is a longitudinal section of a drum-type reactor vessel for smelt reduction.

The apparatus shown in FIG. 1 comprises a reactor vessel of the drumtype with a steel shell 1 and a refractory lining 2. The reactor vessel contains a bath 4 of iron and iron oxides.

The apparatus further comprises injection tuyeres 5 extending through the bottom of the reactor vessel to deliver reactants below the surface 3 of the bath 4 of iron and iron oxides. The injection tuyeres 5 consist of two concentric tubes, an inner tube 6 and an outer tube 7. Natural gas is injected as a protective medium through the annular slot between the two tubes 6 and 7 of each injection tuyere 5. Ore and a carrier gas are blown through the inner tube 6 of one injection tuyere 5 and solid combustibles, mainly ground coal, and a carrier gas are injected through the inner tube 6 of the other injection tuyere 5.

The apparatus further comprises a top blowing tuyere 8 for injecting oxidizing gases with a swirl onto the surface 3 of the bath 4 of iron and iron oxides. The off-gases (post combusted to a large degree) leave the reactor vessel through the opening 9.

Figure 2:
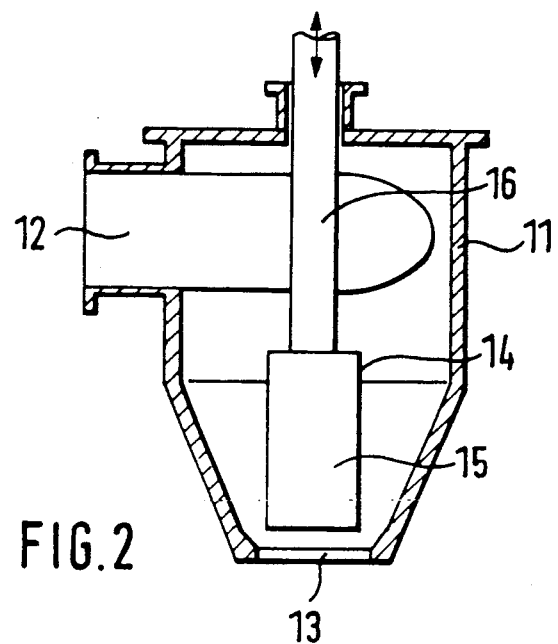
FIG. 2 is a vertical section of a top blowing tuyere which forms part of the reactor vessel shown in FIG. 1.
Figure 3:
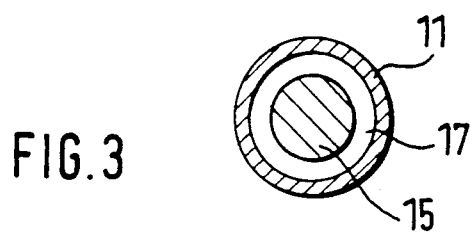
FIG. 3 is an end view of the outlet of the tuyere shown in FIGS. 1 and 2.

As can best be seen in FIG. 2, the tuyere 8 comprises a water-cooled shell 11 with an adjustable tangentially arranged gas inlet 12 and a circular gas outlet 13. The shell 11 contains a piston-type inner member 14. The inner member 14 consists of a flow element 15 and a shaft 16 connected thereto. The inner member 14 can be moved in an axial direction which enables variation of the width of an annular slot 17 (see FIG. 3) defined between the shell 11 and the flow element 15 in the region of the outlet 13.

Under the effect of the gas jet tangentially entering the shell 11 through the inlet 12 and with the help of the flow element 15, the gas jet obtains a swirl as it leaves the opening 17. The adjustable tangentially arranged gas inlet can be used to vary the swirl.

Figure 4:
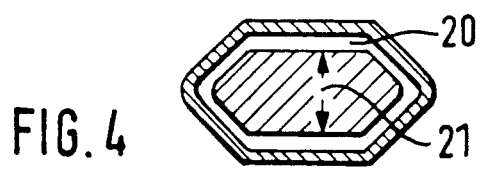
FIGS. 4 and 5 are end views of the outlets of other tuyeres.

FIG. 4 shows an end view of the outlet cross section of another tuyere configuration. Here, 15 mm is the preferred width of the annular slot 20 and 160 mm is the preferred distance 21 between the two closest opposed sides. The smaller diameter 21 of the inner member is preferably at least double and most preferably fivefold the width of the slot 20.

Figure 5:
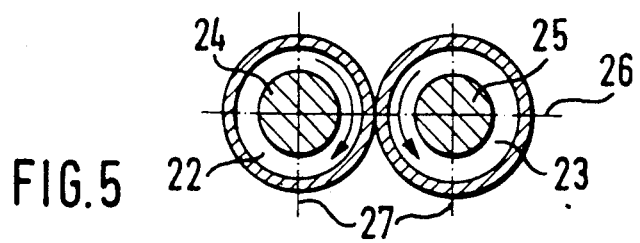

FIG. 5 shows an end view of a twin-type tuyere. It is preferred that in use the direction of swirl in the two annular slots 22 and 23 is in opposite directions, as indicated by the two arrows. The tuyere forms a double hollow jet with two solid cores 24 and 25 and a consequential greater extension in the axial direction 26 than in the axial direction 27.

The drum-type reactor vessel shown in FIG. 1 was used for a trial smelt reduction. Into a bath 4 of about 10 t. coal was injected through bottom tuyeres at a blowing rate of 30 kg/min., ore was injected through bottom tuyeres at a rate of 32 kg/min., and burnt lime for the formation of slag was injected through bottom tuyeres at a rate of 2 kg/min. In order to convey these ground solid materials, approximately 10 $Nm^3$/min., nitrogen was used as a carrier gas. At the same time, approximately 2 $Nm^3$/min. natural gas was injected through the annular slot of each tuyere for the purpose of protecting the injection tuyeres. Also, hot blast air at a temperature of 1200° C. was injected onto the surface 3 of the bath 4 through a tuyere having an outlet of circular cross section and a diameter of 200 mm at a rate of 135 $Nm^3$/min. The absolute pressure was approximately 1.7 bar in the hot blast duct and approximately 1.25 bar in the reactor vessel.

Under favorable conditions using a known free jet, without swirl, the maximum degree of post combustion achieved was 30%. By way of comparison, under the effect of swirl imposed on the top blowing jet, a reliable increase in the degree of post combustion could be achieved which could be controlled accurately by varying the swirl number. For instance, a degree of post combustion of approximately 45% was achieved at a swirl number of approximately 0.5. This enabled an increase in the ore injection rate to around 40 kg/min. without decreasing the iron bath temperature.

Using the same reactor vessel and almost the same operational data as above, it was possible to increase the degree of post combustion considerably by the installation of a top blowing tuyere according to FIG. 2 with a gas outlet opening 13 of 300 mm and an annular slot width 17 of 35 mm diameter. At a swirl number of 0.8, a degree of post combustion of 65% was achieved, and under these conditions it was possible to operate the reactor vessel at a coal injection rate of 25 kg/min. and an ore injection rate of 53 kg/min.

In this relatively small reactor vessel under smelt reduction trial conditions it was possible to reliably and reproducibly achieve the quoted degrees of post combustion.

Many modifications may be made on the preferred embodiments described herein without departing from the spirit and scope of the invention.

We claim:

1. A process for post combustion of reaction gases generated from a molten bath of iron into the space above the surface of the molten bath in a reaction vessel containing said molten bath, said process comprising:
   injecting at least one hollow jet of oxidizing gases into said space toward the surface of the molten bath,
   whereby the reaction gases are combusted with the oxidizing gases in said space above the surface of the molten bath, and the energy produced by said combustion is transferred to the molten bath.

2. A process according to claim 1, wherein said hollow jet of oxidizing gases is annular in transverse section.

3. A process according to any one of claims 1 and 2, wherein pulverized solid reactants are injected in the hollow part of said hollow jet of oxidizing gases.

4. A process for post combustion of reaction gases generated from a molten bath of iron into the space above the surface of the molten bath in a reaction vessel containing said molten bath, said process comprising:
   (1) injecting at least one hollow jet of oxidizing gases into said space toward the surface of the molten bath; and
   (2) imparting a swirl to said hollow jet of oxidizing gases so as to cause the jet of oxidizing gases to enter said space above the surface of the molten bath with a tangential momentum component,
   whereby the reaction gases are combusted with the oxidizing gases in said space, and the energy produced by said combustion is transferred to the molten bath.

5. A process for post combustion of reaction gases generated from a molten bath of iron into the space above the surface of the molten bath in a reaction vessel containing said molten bath, said process comprising:
   (1) injecting at least one hollow jet of oxidizing gases into said space toward the surface of the molten bath;
   (2) imparting a swirl to said hollow jet of oxidizing gases so as to cause the jet of oxidizing gases to enter said space above the surface of the molten bath with a tangential momentum component, whereby the reaction gases are combusted with the oxidizing gases in said space, and the energy produced by said combustion is transferred to the molten bath; and
   (3) controlling the swirl number of said swirl so as to maintain the degree of said combustion at a value between 30% and 100%.

6. A process for post combustion of reaction gases generated from a molten bath of iron into the space above the surface of the molten bath in a reaction vessel containing said molten bath, said process comprising:
   (1) injecting at least one hollow jet of oxidizing gases into said space toward the surface of the molten bath; and
   (2) imparting a swirl to said jet of oxidizing gases so as to cause the jet of oxidizing gases to enter said space with a tangential momentum component, wherein the swirl number of said jet of oxidizing gases is in the range of 0.1 to 5,
   whereby the reaction gases are combusted with the oxidizing gases in said space above the surface of the molten bath, and the energy produced by said combustion is transferred to the molten bath.

7. A process according to claim 6, wherein said swirl number is in the range of 0.1 to 2.

8. A process according to claim 6 or 7, wherein said hollow jet of oxidizing gases is annular in transverse section.

9. A process for the post combustion of reaction gases consisting essentially of carbon monoxide and hydrogen in a reaction vessel, said reaction gases being generated from a molten bath of iron into the space above the molten bath surface, with control of the degree of reaction gas post combustion, said process comprising:
   combusting the reaction gases with oxidizing gases in said space in said vessel with an increased degree of post combustion by injecting at least one jet of oxidizing gas into said space in a direction toward the molten bath surface, and imparting swirl to said jet, with the jet entering said space with a tangential momentum component, and controlling the degree of post combustion by selection of the amount of swirl, to transfer the energy produced by the post combustion to the molten bath.

10. A process for post combustion of reaction gases consisting essentially of carbon monoxide and hydrogen, said reaction gases being generated from a molten bath of iron into the space above the surface of the molten bath in a reaction vessel containing said molten bath, said process comprising:
   (1) injecting at least one jet of oxidizing gases into said space toward the surface of the molten bath;
   (2) imparting a swirl to said jet of oxidizing gases to cause the jet to enter said space with a tangential momentum component to post combust the reaction gases with the oxidizing gases in said space, and to transfer the energy produced by said combustion to the molten bath; and
   (3) controlling the degree of post combustion by selecting the amount of swirl imparted to said jet of oxidizing gases.

11. A process according to claim 10, wherein the swirl number of said jet of oxidizing gases is in the range of 0.1 to 5.

12. A process according to claim 10, wherein the swirl number of said jet of oxidizing gases is in the range of 0.1 to 2.

13. A process according to any one of claims 11 and 12, wherein the swirl number is adjustable to vary the degree of combustion of the reaction gases.

14. A process according to any one of claims 11 and 12, wherein pulverized solid reactants are injected together with the oxidizing gases.

15. A process according to any one of claims 11 and 12, wherein said jet of oxidizing gases is injected towards the bath at an angle to the quiescent bath surface in the range of 10° to 90°.

16. A process according to any one of claims 11 and 12, wherein the oxidizing gases comprise oxygen, air, or mixtures of inert gas, carbon dioxide, water vapor and oxygen.

17. A process according to any one of claims 11 and 12, wherein the oxidizing gases are preheated prior to injection towards the bath surface.

18. A process according to any one of claims 11 and 12, wherein the oxidizing gases consist of air preheated to a temperature in the range of 1000° to 1600° C.

19. A process for post combustion of reaction gases consisting essentially of carbon monoxide and hydrogen, said reaction gases being generated from a molten bath of iron into the space above the surface of the molten bath in a reaction vessel containing said molten bath, said process comprising:
   (1) injecting at least one jet of oxidizing gases into said space toward the surface of the molten bath;
   (2) imparting a swirl to said jet to cause the jet of oxidizing gases to enter said space with a tangential momentum component, whereby the reaction gases are combusted with the oxidizing gases in said space, and the energy produced by said combustion is transferred to the molten bath; and
   (3) selecting the swirl number of said swirl so as to maintain the degree of said combustion at a value above 30%.

20. A process according to claim 19, wherein the swirl number is selected so as to maintain the degree of said combustion at a value between 35% and 80%.

* * * * *